(12) United States Patent
Gloss et al.

(10) Patent No.: US 10,317,600 B2
(45) Date of Patent: Jun. 11, 2019

(54) LIGHT GUIDE, ESPECIALLY FOR SIGNAL LAMPS OF MOTOR VEHICLES

(71) Applicant: Varroc Lighting Systems, s.r.o., Senov u Noveho Jicina (CZ)

(72) Inventors: Tomas Gloss, Cadca (CZ); Tomas Mateju, Bartosovice na Morave (CZ); Jakub Hruska, Hlucin (CZ)

(73) Assignee: VARROC LIGHTING SYSTEMS, S.R.O., Senov o Noveho (CZ)

( * ) Notice: Subject to any disclaimer, the term of this patent is extended or adjusted under 35 U.S.C. 154(b) by 95 days.

(21) Appl. No.: 15/472,916

(22) Filed: Mar. 29, 2017

(65) Prior Publication Data

US 2017/0284624 A1    Oct. 5, 2017

(30) Foreign Application Priority Data

Mar. 30, 2016    (CZ) ............................... PV 2016-183

(51) Int. Cl.
*F21S 43/27*    (2018.01)
*F21S 43/14*    (2018.01)
(Continued)

(52) U.S. Cl.
CPC ............ *G02B 6/0001* (2013.01); *F21S 43/14* (2018.01); *F21S 43/241* (2018.01); *F21S 43/243* (2018.01); *F21S 43/249* (2018.01); *F21S 43/27* (2018.01)

(58) Field of Classification Search
CPC ... G02B 6/0001; G02B 6/0008; F21S 43/249; F21S 43/14; F21S 43/243; F21S 43/241;
(Continued)

(56) References Cited

U.S. PATENT DOCUMENTS 5,680,257 A    10/1997    Anderson
6,850,095 B2 *    2/2005    Sayers ...................... F21V 5/00
362/551

(Continued)

FOREIGN PATENT DOCUMENTS

CZ         2014-711 A3       1/2016
DE       102008002025       12/2008
(Continued)

OTHER PUBLICATIONS

Search Report Completed Sep. 9, 2016 in Corresponding Czech Patent Application No. PV 2016-183 (3 pages).
(Continued)

*Primary Examiner* — Bao Q Truong
(74) *Attorney, Agent, or Firm* — Hovey Williams LLP

(57) ABSTRACT

The light guide, especially for motor vehicle signal lamps, comprises a collimator with a collimating wall for binding and routing light rays, and a light guiding body that continues the collimating wall, is of a material with refractive index (n), and is integral, spatially shaped, planar, and fitted at its end with an output emitting surface providing a signal light function. The first height (d) of the body at its beginning where it adjoins the collimating wall, is bigger than its second height where it passes into the emitting surface. The body is adapted to emit light rays generally within angle (ω) of diffusion from the optical axis (x), and comprises a transitional surface that is, in its profile towards the emitting surface, inclined towards the longitudinal axis of the profile. The ratio of inclination height (a) and inclination length (b) of the transitional surface is defined as:

Figure 1:
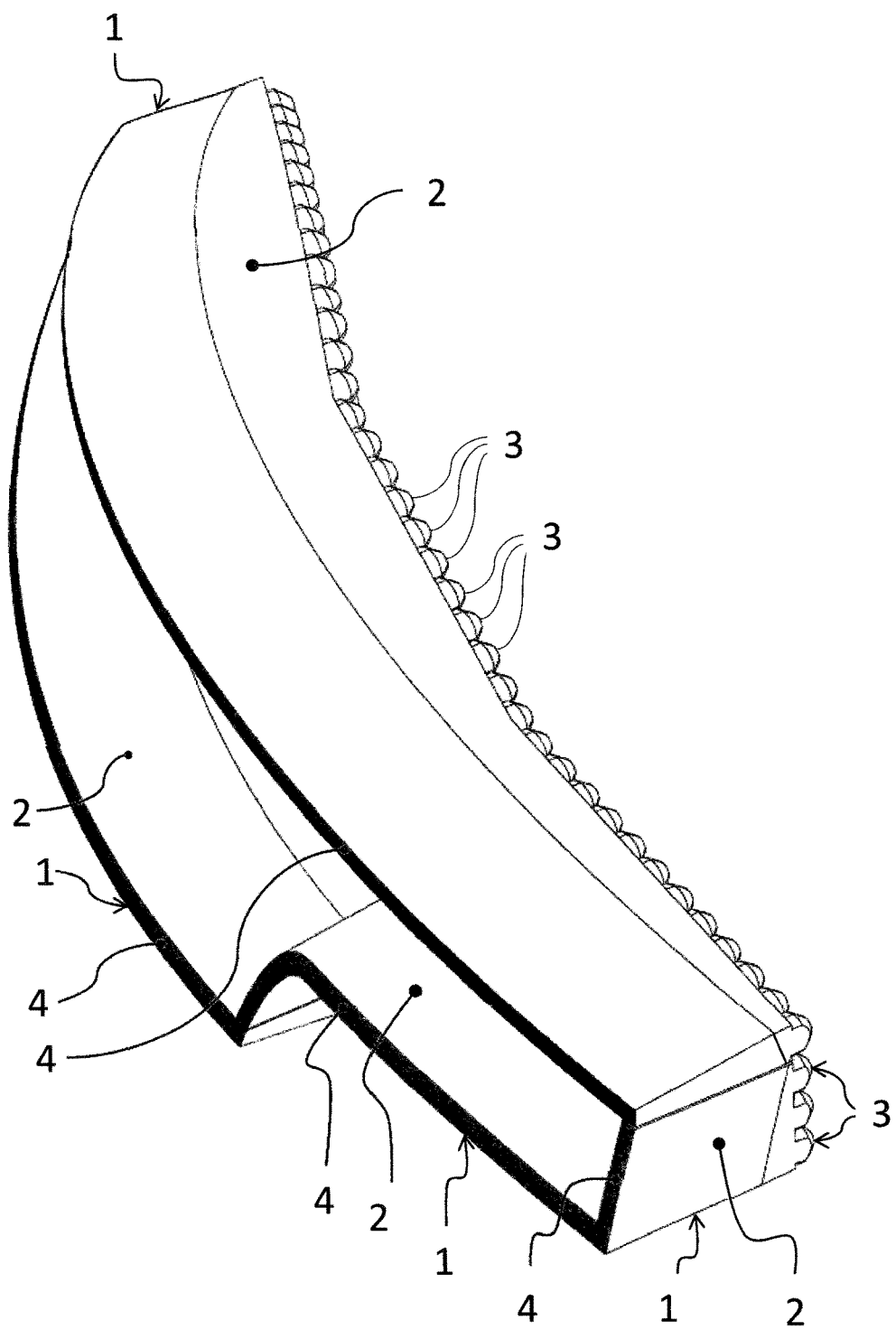

$$\frac{a}{b} = tg\left(\frac{1}{2}\arcsin\left(\frac{\sin\omega}{n}\right)\right)$$

(Continued)

10 Claims, 7 Drawing Sheets

(51) Int. Cl.
*F21V 8/00* (2006.01)
*F21S 43/241* (2018.01)
*F21S 43/243* (2018.01)
*F21S 43/249* (2018.01)

(58) Field of Classification Search
CPC ........ F21S 43/27; F21S 43/235; F21S 43/236; F21S 43/237; F21S 43/242; F21S 43/245; F21S 43/247; F21V 2200/00; F21V 2200/10; F21V 2200/13; B60Q 1/00; B60Q 1/0011; B60Q 1/26; F21W 2103/20
USPC ........................................................ 362/511
See application file for complete search history.

(56) References Cited

U.S. PATENT DOCUMENTS

| | | | |
|---|---|---|---|
| 6,937,791 B2 * | 8/2005 | Guy ......................... | F21V 5/04 385/33 |
| 7,215,863 B1 | 5/2007 | Arenella et al. | |
| 2004/0213001 A1 | 10/2004 | Sayers et al. | |
| 2006/0061870 A1 | 3/2006 | Wang | |
| 2008/0304277 A1 | 12/2008 | Chinniah | |
| 2016/0109098 A1 | 4/2016 | Martoch | |

FOREIGN PATENT DOCUMENTS

| | | |
|---|---|---|
| JP | 2005228510 | 8/2005 |
| JP | 2015049977 | 3/2015 |

OTHER PUBLICATIONS

German Office Action dated Nov. 8, 2018; with foreign references attached. 37 pages.
English Translation of German Office Action.
English Abstract Translation of JP 2005228510.
English Abstract Translation of JP 2015049977.

* cited by examiner

LIGHT GUIDE, ESPECIALLY FOR SIGNAL LAMPS OF MOTOR VEHICLES

FIELD OF THE INVENTION

The invention relates to a light guide, especially for signal lamps of motor vehicles, thus belonging to the field of the design of optical devices intended mainly for indication of a vehicle or signaling for other traffic participants. The light guide is especially designed to achieve the required emission characteristic of the output light trace of a signal lamp of motor vehicles.

BACKGROUND INFORMATION

In the field of the lighting equipment design of motor vehicles, a special position is occupied by light guides whose elongated shape makes them suitable to create light lines, e.g. to emit a position, brake, fog, indicator or day light. At present, light guides often fulfill signal light functions subject to higher requirements for the luminous flux, as e.g. the daily light in headlights and the rear brake and direction indication lights in the rear lamps. Semiconductor LEDs (light emitting diodes) are most frequently used to generate light, being positioned at the front of the light guide or installed in a recess in the entry part of light guides. Light guides of thin dimensions do not completely bind light into the light guide and a part of the light rays is lost. For this purpose, collimators are used, which help to bind light to the light guide, which increases the efficiency of the optical system. In some cases, collimators are designed as a separate part.

A number of optical systems are known from the prior art that are adapted to bind light to the light guide and to guide light in the light guide in such a way as to ensure the required light characteristic of the output light trace. E.g. the documents CZ20140711, US20080304277, U.S. Pat. Nos. 6,937,791, 7,215,863 and US2004213001 disclose designs where a collimator is an integral part of the light guide. Generally, collimators with a diameter of 7-15 mm can be advantageously used for effective binding of light, ensuring high efficiency of the system. However, if a collimator with bigger dimensions is used at the input, a thin light emitting output surface cannot be easily provided at the output unless the light guide gets narrower in the direction from the light source. But if the light rays are reflected in various ways inside the light guide body, they may exit under any angle from the output surface, which reduces efficiency with respect to the output characteristic required by regulations. So to increase efficiency of an optical system it is advantageous to get the output light beam directed under a certain angle from the optical axis. The effective angle is defined by the light function and its required output characteristic. Depending on the type of the light function, the horizontal diffusion of the output light should preferably be from 5° to 25°, the vertical diffusion from 5° to 10°. However, variability of the mechanical design of the light device is very often limited, which affects the emission characteristics of the resulting light trace or requires adaptation of the mechanical design of the light device or even redesigning of the entire light guide.

The objective of the invention is to eliminate the shortcomings of the prior art, especially to increase efficiency of the optical system by efficiently binding the light rays of the LED light source to the light guide and by improving the routing and guiding of light propagating through the light guide. Another objective is to ensure diffusion of the output light under the angle of 5° to 25° (or 5° to 10°, respectively), the diffusion of the output light being ensured through a small/narrow output surface to achieve the designer requirements. At the same time, a homogeneous appearance of various shapes of the output light trace must be guaranteed, the light being only emitted to the required area based on the required characteristic of the signal function. The shape of the light guide must be adaptable to the mechanical design of the light device and the required characteristic of the light trace while at the same time, it must have a simple design and low production costs.

PRINCIPLE OF THE INVENTION

The above mentioned objectives of the invention are fulfilled by a light guide, especially for signal lamps of motor vehicles, in accordance with the invention, comprising at least one collimator with a collimating wall for binding and routing light rays emitted by the lighting means in the light guide, and a light guiding body that continues the collimating wall, is integral, spatially shaped, with a profile elongated in the direction of the optical axis (x), and is fitted at its end with an output emitting surface designed to provide at least one signal light function. The light guiding body can be made of a material with a refractive index the principle of which consists in the fact that the first height of the body, which is the height of the body at its beginning where the light guiding body adjoins the end of the collimating wall, is bigger than the second height of the body, which is its height at its end where it passes into the emitting surface. The light guiding body is adapted to emit light rays substantially only within an angle of diffusion from the direction of the optical axis. In addition, the light guiding body comprises at least one transitional surface that is, in the profile of the body towards the emitting surface, inclined towards the longitudinal axis of the profile, the ratio of the inclination height and inclination length on the transitional surface being defined by the relationship:

$$\frac{a}{b} = tg\left(\frac{1}{2}\arcsin\left(\frac{\sin \omega}{n}\right)\right)$$

In one of the embodiments, the first height is in the range from 5 mm to 25 mm and the second height is 2 mm to 15 mm.

In one of the embodiments, the light guiding body is configured to emit light rays generally within the limits of diffusion from the optical axis direction, amounting to 5° to 25°.

In one of the embodiments, the light guide is configured for just one reflection of a particular light ray from the transitional surface.

In one of the embodiments, the light guiding body comprises a superstructural segment that is situated between the collimating walls and the transitional surfaces.

The height of the superstructural segment can be constant in the direction from the collimator to the transitional surface of the light guiding body.

In another one of the embodiments, the superstructural segment is a molding and it is beveled under a withdrawing angle in the direction towards or from the collimator.

In one of the embodiments, the profile of the light guiding body is axially symmetrical with respect to the longitudinal axis of the profile, so that in this profile, the light guiding body comprises two transitional surfaces facing each other, in this profile represented by axially symmetrical curves, especially straight lines having the same size of inclination lengths and the same size of inclination heights.

In one of the embodiments, the light guiding body comprises at least two transitional surfaces that differ from each other with the length and/or height of their inclination in the particular profile.

OVERVIEW OF FIGURES IN THE DRAWINGS

Figure 2:
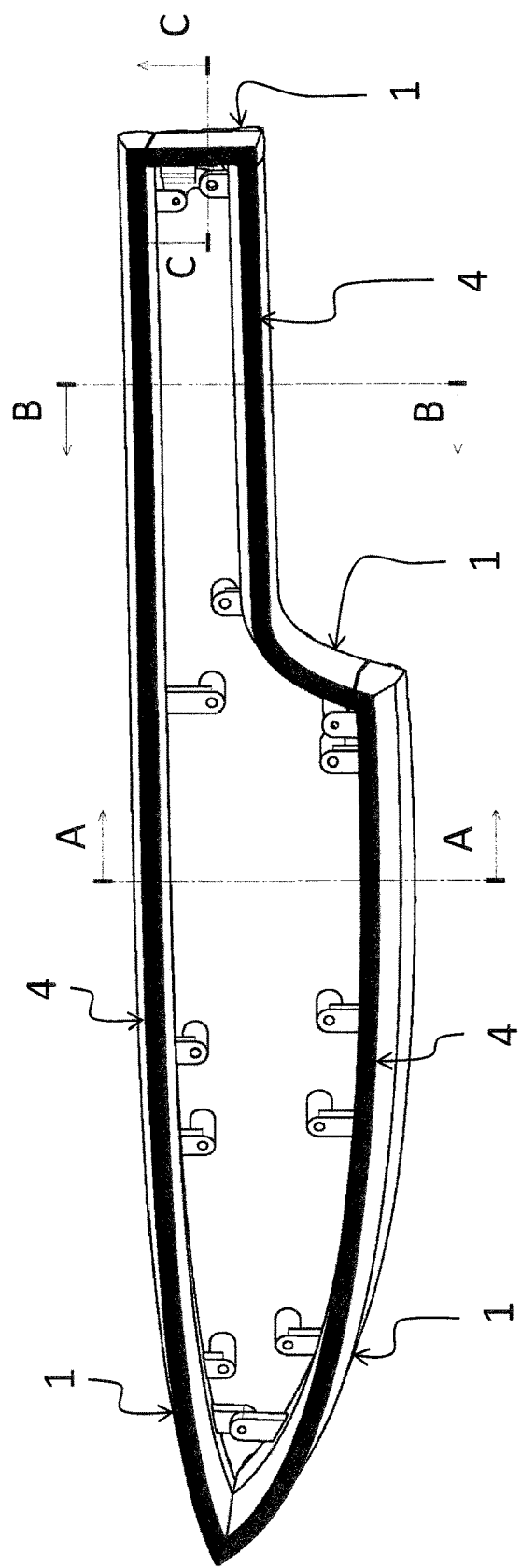
Figure 3:
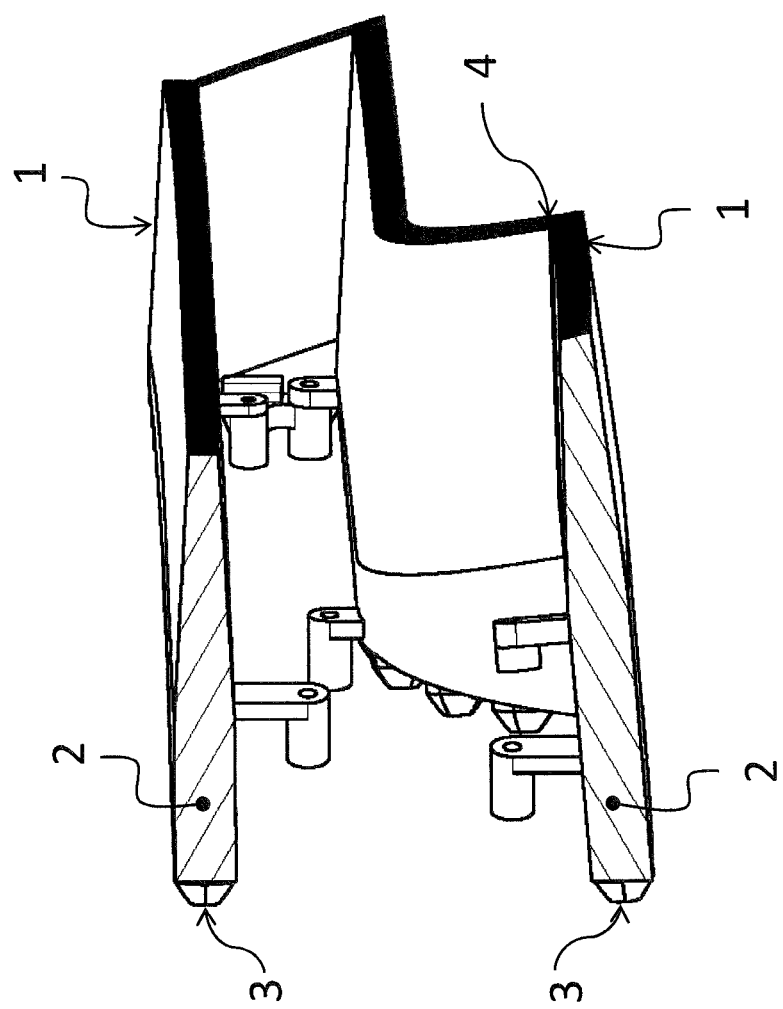
Figure 4:
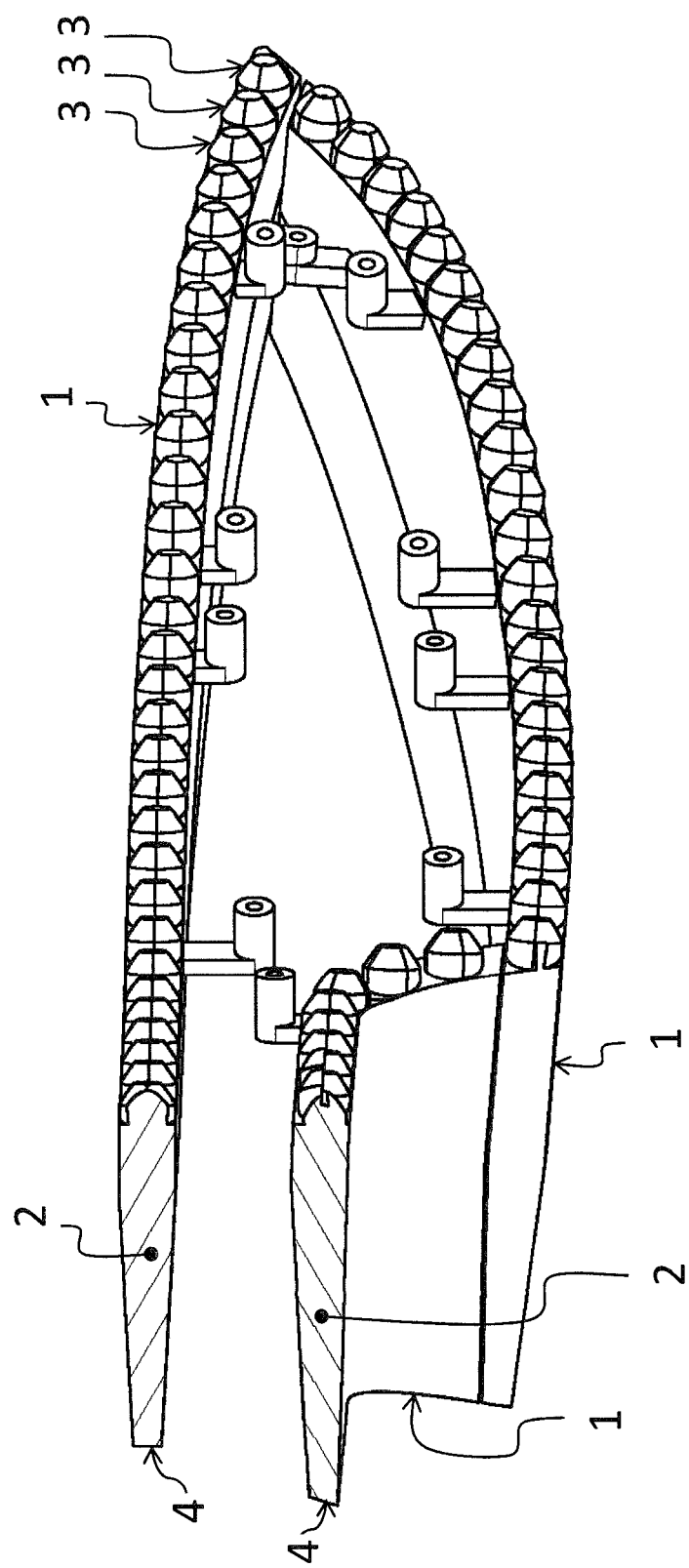
Figure 5:
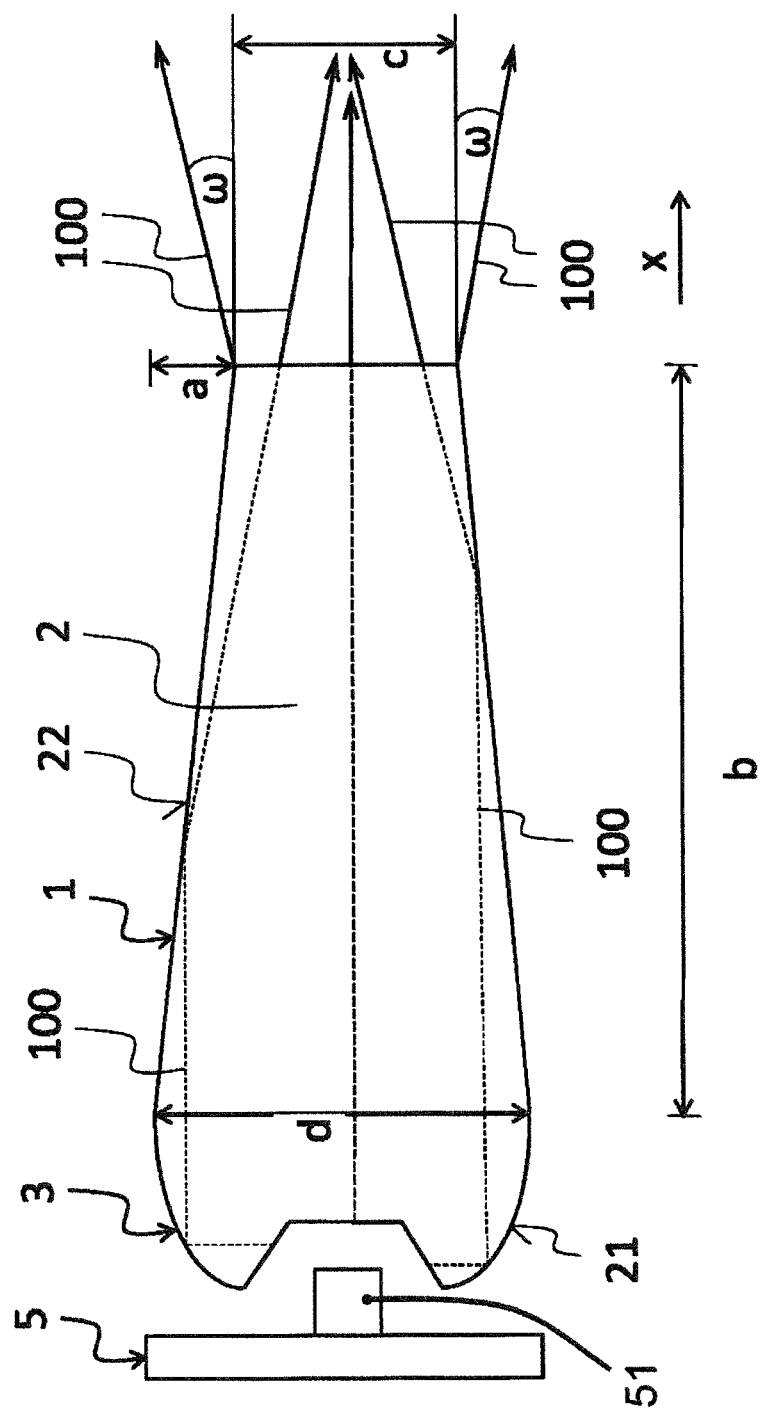
Figure 6:
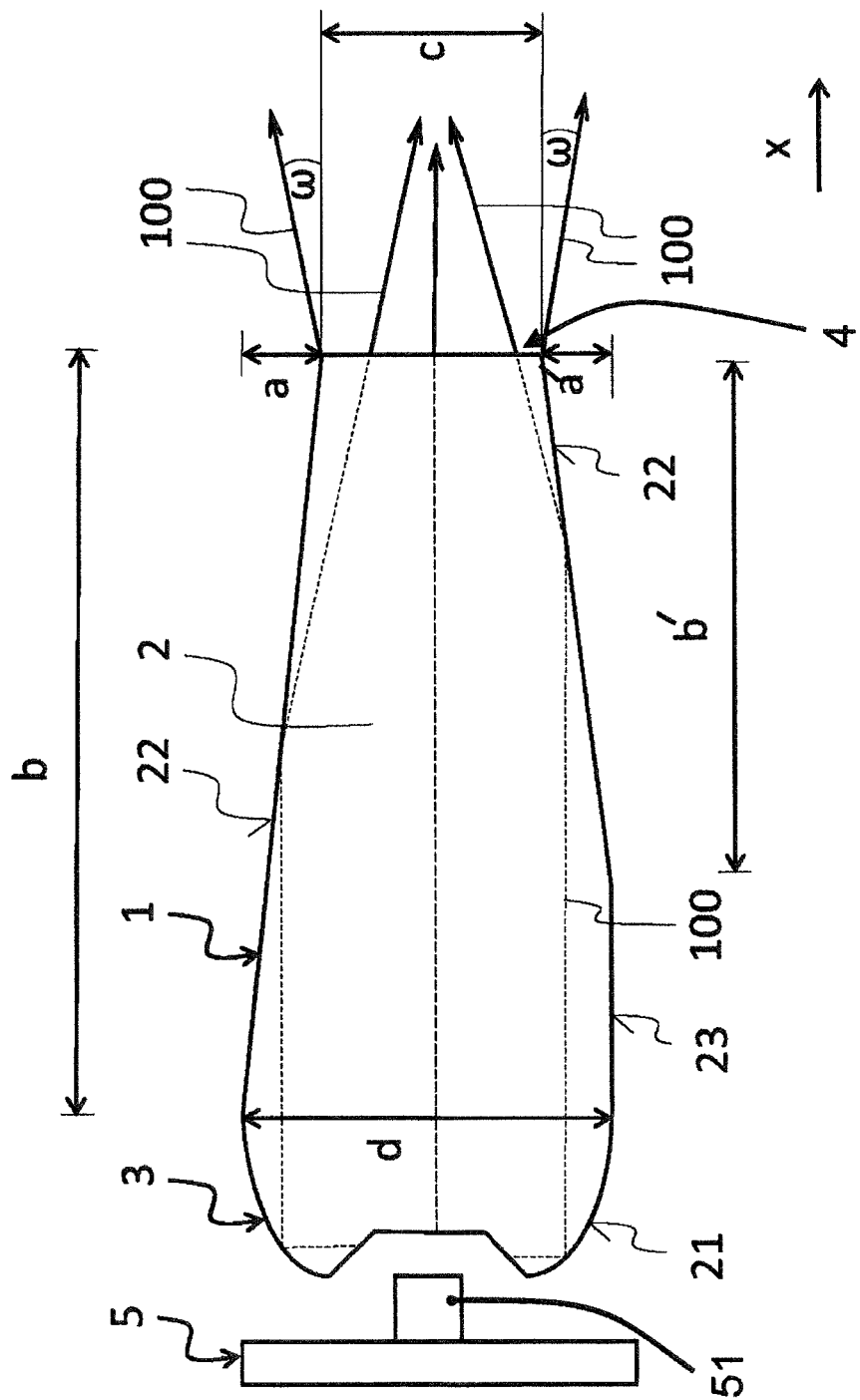
Figure 7:
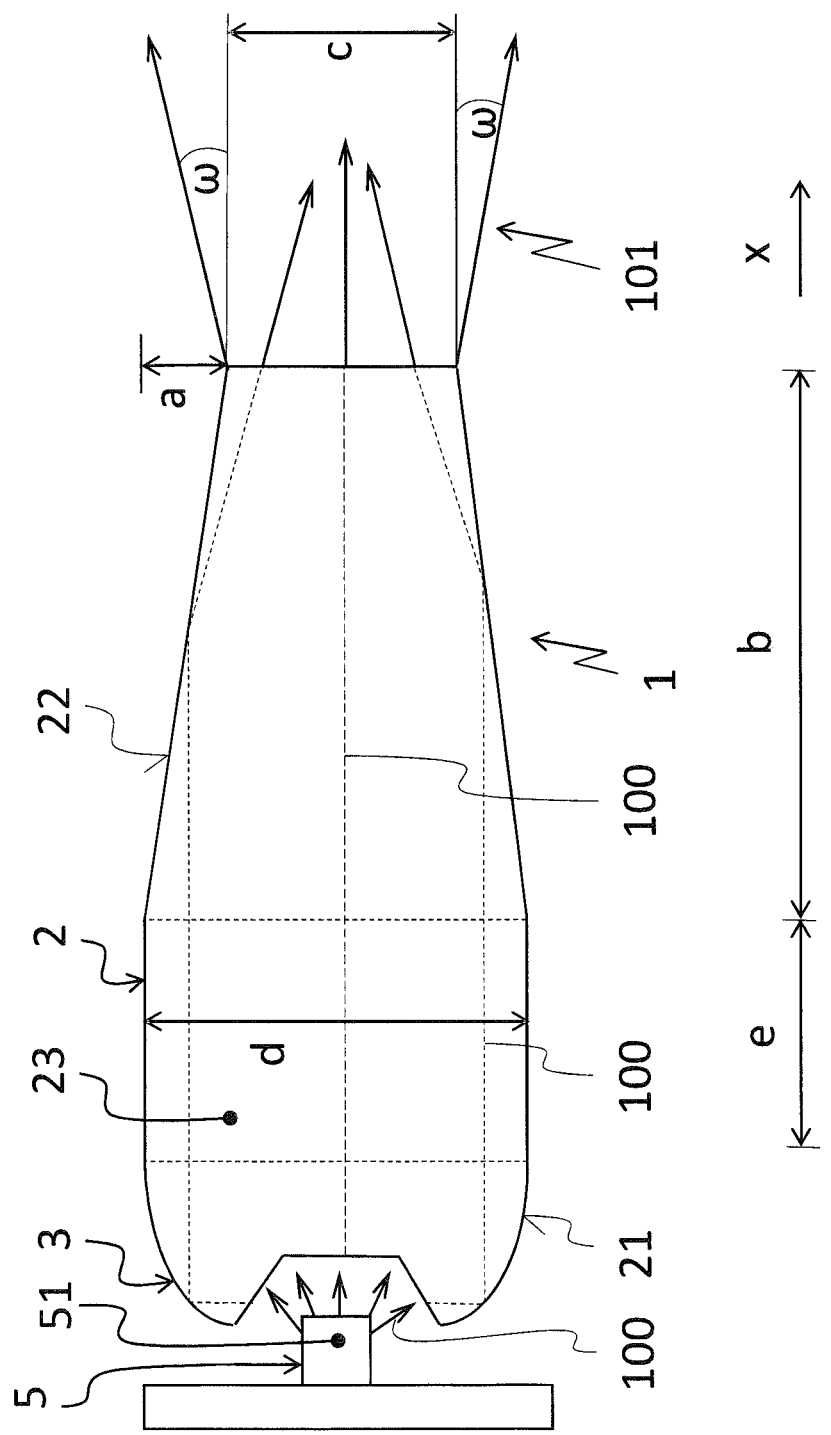

The invention will be clarified in a more detailed way with the use of its embodiment examples with references to attached drawings, where:

FIG. 1 represents an axonometric view of the light device using the first embodiment of the light guide in accordance with the invention, FIG. 2 shows a front view of the light device from FIG. 1, FIG. 3 shows a longitudinal section A-A taken through the light device from FIG. 2, FIG. 4 shows a longitudinal section B-B taken through the light device from FIG. 2, FIG. 5 shows a longitudinal section C-C taken through the light device from FIG. 2, FIG. 6 shows a longitudinal section through a second embodiment of the light guide in accordance with the invention, and FIG. 7 shows a longitudinal section through a third embodiment of the light guide in accordance with the invention.

EXAMPLES OF EMBODIMENTS

FIGS. 1, 2, 3 and 4 show a first embodiment of the light guides in accordance with the invention in different views. The light device comprises four light guides implemented in the form of integral, spatially shaped planar elements 1. Each light guiding element 1 comprises a planarly shaped light guiding body 2 adapted to conduct light. The light guiding body 2 is designed as light conducting, and is fitted with collimators 3 at its entry part and with a continuous emitting surface 4 on its outer side. In addition, the light guiding body 2 gets narrower from the collimator 3 towards the emitting surface 4, i.e. the longitudinal profile gets smaller in the direction of the optical axis x. Each emitting surface 4 of the light device is adapted to provide a different light function, e.g. to emit the positional, brake, direction indicator or fog light, the emitting surfaces 4 creating a certain designer element.

FIG. 5 represents a detailed view of the first embodiment of the light guide, which is used in the light device from FIG. 1, wherein the collimator 3 is adapted to bind light rays 100 emitted by the lighting means 5 to the light guiding body 2 of the light guide. The light rays 100 emitted by the light sources 51 of the lighting means 5 are reflected from the collimating walls 21, e.g. of an ellipsoid shape, to a direction that is approximately parallel to the direction of the optical axis X. The light rays 100 are either reflected from the transitional surface 22 to the emitting surface 4, namely generally through one reflection, or they are directly sent to the emitting surface 4 from the collimating walls 21.

The exiting light rays 100 create a light beam generally with a diffusion angle ω, namely generally with the diffusion angle ω in the range of 5° to 25°. The diffusion angle ω is an intended—designed angle. In fact, due to places exhibiting micro-roughness and production imperfections, the light guide always lights, though at low intensities, with a larger diffusion angle. For this reason, we indicate "generally with a diffusion angle ω". So the meaning of the word generally should be understood in this context.

In the horizontal direction, the diffusion of the output light is generally 5° to 25° and in the vertical direction preferably generally 5° to 10°. The height d of the light guide body 2 preferably varies in the range of 5 mm to 25 mm, while the inclination height a preferably varies in the range of 2 mm to 15 mm, and the height c of the emitting surface 4 preferably varies in the interval of 2 mm to 15 mm. The ratio of the inclination height a and the inclination length b in the transitional surface 22 results from the relationship:

$$\frac{a}{b} = tg\left(\frac{1}{2}\arcsin\left(\frac{\sin\omega}{n}\right)\right)$$

Where:
n is the refractive index of the material,
ω is the diffusion angle,
a is the inclination height, and
b is the inclination length.

The transitional surface 22 can be a transitional plane, which is therefore displayed as a line segment in its profile.

To achieve the required output characteristics of the light trace and to be able to adapt the dimensions of the light guide to the mechanical design of the light device at the same time, the required inclination height a or inclination length b of the transitional surface 22 must first be selected, while the selection of the parameter a or b primarily depends on the entire mechanical installation conditions of the light device. One of the parameters a, b is always more important. The dimension of this more important parameter is selected based on the possibilities of the installation space and the other parameter is determined by calculation. E.g., in the installation space of a light device, a light guide with the body height d can be positioned while the design requires a certain height c of the output surface and diffusion angle ω. Based on these dimensions, the inclination length b is subsequently determined so that the light rays exiting from the emitting surface 4 can only be directed within the required angular diffusion. However, the mechanical design may exhibit a certain limitation concerning the installation depth, which represent a certain limitation for the inclination length b while, in such a case, the inclination height a is determined by calculation.

FIG. 6 shows the second embodiment of the light guide, which comprises two transitional surfaces 22 with different inclination lengths b, b' and different inclination heights a, a'. Either transitional surface 22 is subject to the above mentioned relationship between the inclination length b of this transitional plane 22 and the inclination height a of this inclination plane 22. The collimator 3 is designed as symmetrical, while between the collimator 3 and the shorter inclination length b' a superstructural element 23 is situated.

FIG. 7 shows a third embodiment of the light guide wherein the light guiding body 2 contains a superstructural segment 23 having the length e, which is situated between the collimator 3 and the transitional surfaces 22, its longitudinal profile being constant in the direction from the collimator 3 to the transitional surfaces 22 of the body 2. End light ray 101 generally delimits, in vertical direction, a boundary of an angle range within which rays 100 are emitted from the emitting surface 4. In another embodiment, the superstructural element may be beveled under a withdrawing angle to improve moldability, depending on the mold design, in the direction towards or from the collimator.

LIST OF REFERENCE MARKS

1—element
2—light guiding body
21—collimating wall
22—transitional surface
23—superstructural element
3—collimator
4—emitting surface
5—lighting means
51—light source
100—light ray
101—end light ray
n—refractive index of the material,
ω—diffusion angle,
a, a'—inclination height,
b, b'—inclination length,
c—height of the emitting surface
d—body height
e—elongation length
X—optical axis

The invention claimed is:

1. A light guide for a signal lamp of a motor vehicle, comprising:
    (a) at least one collimator with a collimating wall for binding and routing light rays emitted by a lighting means in the light guide; and
    (b) a light guiding body that:
        (1) is directly connected with the collimator,
        (2) continues the collimating wall,
        (3) is spatially shaped,
        (4) has a profile elongated in the direction of an optical axis (x), and
        (5) is fitted at its end with an output emitting surface designed to provide at least one signal light function,
    wherein the light guiding body is made of a material with a refractive index (n), wherein a first height (d) of the light guiding body, which is its height at its beginning where the light guiding body adjoins the end of the collimating wall, is bigger than a second height (c) of the light guiding body, which is its height at its end where it passes into the emitting surface, wherein the light guiding body is adapted to emit light rays essentially within an angle (w) of diffusion from the direction of the optical axis (x), and wherein the light guiding body comprises at least one transitional surface that is, in the profile of the light guiding body towards the emitting surface, inclined towards the longitudinal axis of the profile, the ratio of the inclination height (a) and inclination length (b) on the transitional surface being defined by the relationship:

$$\frac{a}{b} = tg\left(\frac{1}{2}\arcsin\left(\frac{\sin \omega}{n}\right)\right).$$

2. The light guide according to claim 1, wherein the first height (d) is in the range from about 5 mm to about 25 mm, and the second height (c) is about 2 mm to about 15 mm.

3. The light guide according to claim 1, wherein the light guiding body is configured to emit light rays generally within the limits of the angle (w) of diffusion from the direction of the optical axis (x), which angle of diffusion is about 5° to about 25°.

4. The light guide according to claim 1, wherein the light guide is configured for just one reflection of a particular light ray from the transitional surface.

5. The light guide according to claim 1, wherein the light guiding body comprises a superstructural segment that is situated between the collimating wall and the transitional surface.

6. The light guide according to claim 5, wherein the height (d) of the superstructural segment is constant in the direction from the collimator towards the transitional surface of the light guiding body.

7. The light guide according to claim 5, wherein the superstructural segment is a molding and is beveled under a withdrawing angle in the direction towards or from the collimator.

8. The light guide according to claim 1, wherein the profile of the light guiding body is axially symmetrical with respect to the longitudinal axis of the profile, wherein the light guiding body comprises two transitional surfaces facing each other, and wherein the two transitional surfaces comprise axially symmetrical curves having the same size of inclination lengths (b) and the same size of inclination heights (a).

9. The light guide in accordance with claim 1, wherein the light guiding body comprises at least two transitional surfaces that differ from each other in their respective profiles with the length (b) and/or height (a) of their inclination.

10. The light guide according to claim 1, wherein the transitional surface is a transitional plane, which is displayed as a line segment in the said profile.

* * * * *